United States Patent
Suzuki

[11] Patent Number: 6,101,583
[45] Date of Patent: *Aug. 8, 2000

[54] DIGITAL SIGNAL PROCESSOR FOR DELAYED SIGNAL PROCESSING USING MEMORY SHARED WITH ANOTHER DEVICE

[75] Inventor: Norio Suzuki, Hamamatsu, Japan

[73] Assignee: Yahama Corporation, Shizuoka-ken, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/781,178

[22] Filed: Dec. 16, 1996

[30] Foreign Application Priority Data

Dec. 28, 1995 [JP] Japan .................. 7-343686

[51] Int. Cl.⁷ .................................................. G06F 12/00
[52] U.S. Cl. ........................................ 711/147; 84/630
[58] Field of Search ............................. 711/130, 147, 711/151, 158; 84/630

[56] References Cited

U.S. PATENT DOCUMENTS

| | | |
|---|---|---|
| 5,218,710 | 6/1993 | Yamaki et al. ..................... 704/278 |
| 5,498,835 | 3/1996 | Ichiki .................................. 84/630 |
| 5,546,547 | 8/1996 | Bowes et al. ...................... 710/114 |
| 5,551,010 | 8/1996 | Iino et al. .......................... 711/169 |
| 5,567,900 | 10/1996 | Higashi ............................. 84/602 |
| 5,613,147 | 3/1997 | Okamura et al. .................. 84/630 |
| 5,619,579 | 4/1997 | Ando et al. ........................ 84/630 |
| 5,630,153 | 5/1997 | Intrater et al. ..................... 712/35 |
| 5,703,312 | 12/1997 | Takahashi et al. ................. 84/630 |
| 5,761,643 | 6/1998 | Furuhashi ......................... 711/147 |

FOREIGN PATENT DOCUMENTS

| | | |
|---|---|---|
| 63-316165 | 12/1988 | Japan . |
| 3-28894 | 2/1991 | Japan . |
| 5-165630 | 7/1993 | Japan . |

Primary Examiner—Do Hyun Yoo
Assistant Examiner—Gary J. Portka
Attorney, Agent, or Firm—Reed Smith Hazel & Thomas LLP

[57] ABSTRACT

In each sampling period, sample data and a count value WA of a ring buffer counter 11 are supplied to a RAM 202 through a bus control circuit 14 as write data and a write address. Each cache block stored in a data buffer $DB_0$ and so on is used for executing an FIR filtering operation. As an amount of unused sample data in the cache block is decreased, subsequent cache blocks used for a subsequent FIR filtering operation are supplemented to the data buffers $DB_0$ and so on by the cache counter units $CC_0$ and so on.

11 Claims, 6 Drawing Sheets

*FIG. 5*

LINE NUMBER

| | | | | |
|---|---|---|---|---|
| 0 | | SEL T0; | MUL C0; | ACLR |
| 1 | WT 0; | SEL T1; | MUL C1; | |
| 2 | WT 1; | SEL T2; | MUL C2; | |

(LINES BETWEEN 3 ~ 62 OMITTED)

| | | | |
|---|---|---|---|
| 63 | WT 62; | SEL T63; | MUL C63; |
| 64 | WT 63; | SEL IN; | MUL C64; |
| 65 | | SEL T65; | MUL C65; |
| 66 | WT 65; | SEL T66; | MUL C66; |

(LINES BETWEEN 67 ~ 126 OMITTED)

| | | | |
|---|---|---|---|
| 126 | WT 125; | SEL T126; | MUL C126; |
| 127 | WT 126; | SEL T127; | MUL C127; |
| 128 | WT 127; | SEL ACC; | OUTPUT |

DIGITAL SIGNAL PROCESSOR FOR DELAYED SIGNAL PROCESSING USING MEMORY SHARED WITH ANOTHER DEVICE

BACKGROUND OF THE INVENTION

1. Field of the Invention

The present invention relates to a digital signal processor (DSP) suitable for filtering, reverberation addition processing, and so on.

2. Related Art

A DSP is a processor developed mainly for the purpose of executing product sum calculations at a high speed. For example, in the field of audio applications, the DSP is used for digital signal processing which requires the real time nature, such as filtering, reverberation addition processing, and so on for audio signals.

A DSP 100 illustrated in FIG. 4 is an example of this type of DSP. In FIG. 4, an input register 101 stores a digital signal to be processed by the DSP 100. Specifically, the DSP 100 is supplied with sample data such as an audio signal or the like every sampling period, and such sample data is supplied to the inside of the DSP 100 through the input register 101. A coefficient register 102 stores coefficients (filter coefficients) used in multiplication for a product sum calculation. A multiplier 103 executes the multiplication for the product sum calculation. An adder input selector 104, an adder 105, an accumulator input selector 106, and an accumulator 107 constitute a means for adding a multiplication result derived from the multiplier 103 to a so far derived calculation result to generate a target calculation result. A temporary memory 108, capable of simultaneous reading and writing, is used as a delay means for holding sample data or calculation results for an arbitrary time period. An external memory control circuit 109 is used when an external memory, not shown, is used as an additional delay means for controlling input/output of sample data and so on to and from the external memory. A main selector 110 controls the switching of a flow of sample data and calculation results, and an output register 111 stores a processed result to be outputted.

In the drawing, a variety of character strings written in lower-case alphabet letters are attached to some of the components described above. These character strings represent the names of control signals supplied to associated components when an instruction decoder, not shown, decodes instructions.

In the following, the operation of the DSP 100 will be described in connection with examples in which an FIR (Finite Impulse Response) filtering operation is performed and in which reverberation addition processing is performed.

(1) Operations when FIR Filtering is Performed:

Here, the operation of the DSP 100 will be described for an example in which the DSP 100 executes the FIR filtering operation expressed by the following equation:

$$y(t) = \sum_{i=0}^{64} a_i x(t-i) + \sum_{i=0}^{62} b_i y(t-i) \quad \text{[Equation 1]}$$

where $x(t-i)$ represents input sampling data in a sampling period i sampling periods before, $y(t)$ represents the result of the FIR filtering operation in the current sampling period, and $y(t-i)$ represents the result of the FIR filtering operation in a sampling period i sampling periods before. $a_i$ (i=0–64) and $b_i$ (i=0–62) are different filter coefficients, respectively.

FIG. 5 shows a list of an exemplary program for executing the FIR filtering operation mentioned above. For facilitating the explanation, a line number is added on the left side of each program line. While each line constituting the program includes a plurality of instructions, the instructions included on the same line are simultaneously executed in parallel. The functions provided by respective instructions are described below.

SEL xx: The execution of this instruction causes a selection signal msel to be supplied to the main selector 110 which responsively switches an input signal to be selected. Explaining more specifically how this instruction is used in connection with the program shown in FIG. 5 as an example, the execution of the SEL instruction causes the main selector 110 to select an input signal as follows:

SEL IN: select output data of the input register 101;

SEL ACC: select output data of the accumulator 107; and

SEL Txx: select output data of the temporary memory 108. In this case, since a read address tradr corresponding to xx is also supplied to the temporary memory 108 in addition to the selection signal msel, the contents at address xx in the temporary memory 108 is selected by the main selector 108.

MUL xx: this instruction sets data xx to the coefficient register 102, and a product sum calculation using the data xx is executed by the multiplier 103, the adder 105 and the accumulator 107. For example, an instruction "MUL C2" on the second line of the program shown in FIG. 5 supplies data C2 to the multiplier 103 through the coefficient register 102, instructs the multiplier 103 to multiply the data C2 by output data of the main selector 110, and instructs the adder 105 to add the result of this multiplication and output data of the accumulator 107. Then, the addition result of the adder 105 is written into the accumulator 107 through the accumulator input selector 106 when the program proceeds to the execution of instructions on the third line.

ACLR: this instruction clears the accumulator 107.

WT xx: This instruction supplies a write enable signal twe and a write address twadr corresponding to xx to the temporary memory 108, and writes output data of the main selector 110 into the temporary memory 108 at address xx.

OUTPUT: this instruction generates an output enable signal owe to deliver output data of the main selector 110 to the outside through the output register 111.

Next, the contents of specific processing executed by the exemplary program will be described. In this exemplary program, instructions on lines 0–63 are executed to perform the convolution operation of the first term in the aforementioned Equation 1, instructions on lines 64–128 are executed to perform the convolution operation of the second term and to add the result of the calculation of the first term and the result of the calculation of the second term. As sampling data $x(t-i)$ (i=0–64) for previous 65 sampling periods are used in the calculation of the first term, the respective sampling data $x(t)$–$x(t-63)$ are stored in the temporary memory 108 at corresponding addresses 63–0, respectively. Also, as calculation results $y(t-i)$ (i=0–62) for previous 63 sampling periods are used in the calculation of the second term, respective calculation results $y(t)$–$y(t-62)$ are stored in the temporary memory 108 at corresponding addresses 127–65, respectively. The processing for storing the sample data and calculation results into the temporary memory 108 as mentioned above will be described later. While each MUL instruction in the program uses data C0 - C127, data C64 - C0 correspond to the coefficients $a_i$ (i=0–64), and data C127 - C65 correspond to the coefficients bi (i=0-62).

In the following, the operation of the DSP 100 associated with the FIR filtering operation will be described along the program shown in FIG. 5.

In the DSP 100, the program shown in FIG. 5 is executed once every sampling period. First, on the 0th line of the program, sample data x(t−64) stored in the temporary memory 108 at address 0 is read and outputted through the main selector 110 (SEL T0). Also, the output data x(t−64) of the main selector 110 is multiplied by data C0 (coefficient $a_{64}$) (MUL C0), and the accumulator 107 is cleared (ACLR).

Next, turning to the first line, output data of the accumulator 107 (=0) is added to output data $a_{64}$x(t−64) of the multiplier 103 by the adder 105 and the sum is supplied to and written into the accumulator 107 from the adder 105. Also, sample data x(t−63) stored in the temporary memory 108 at address 1 is outputted through the main selector 108 (SEL T1), and this output data x(t−63) is written into the temporary memory 108 at address 0 (WT 0). Further, the multiplier 103 multiplies the output data x(t−63) of the main selector 110 by data C1 (coefficient $a_{63}$) (MUL C1).

Next, turning to the second line, output data (=$a_{64}$x(t−64)) of the accumulator 107 is added to output data $a_{63}$x(t−63) of the multiplier 103 by the adder 105 and supplied from the adder 105 to the accumulator 107 and written into the accumulator 107. Also, sample data x(t−62) stored in the temporary memory 108 at address 2 is outputted through the main selector 110 (SEL T2), and this output data x(t−62) is written in the temporary memory 108 at address 1 (WT 1). Further, the multiplier 103 multiplies the output data x(t−62) of the main selector 110 by data C2 (coefficient $a_{62}$) (MUL C2).

Next, by executing the next third line (not shown), the sum of output data ($a_{64}$x(t−64)+$a_{63}$(t−63)) of the accumulator 107 and output data $a_{62}$x(t−62) of the multiplier 103 is written into the accumulator 107.

Subsequently, the processing for accumulating the product of sample data x(t−i) and a coefficient $a_i$ in the accumulator 107 and the processing for shifting sample data x(t−i) to an address one number less than the current address in the temporary memory 108 are sequentially executed in a similar manner.

Then, turning to the 64$^{th}$ line, the input register 101 is selected by the main selector 110 (SEL IN), so that sample data x(t) in the current sampling period, stored in the input register 101, is written into the temporary memory 108 at address 63 through the main selector 110 (WT 63).

The sample data x(t) thus written into the temporary memory 108 is subsequently shifted from address 63 to address 62, from address 62 to address 61, and so on, each time a sampling period ends and the next sampling period begins. As a result of the shift operation performed as described above, a sequence of sample data for previous 64 sampling periods are stored in the temporary memory 108 from address 63 to address 0.

Also, on the 64$^{th}$ line of the program, the multiplier 103 multiplies the output data x(t) of the main selector 110 by data C64 (coefficient $a_0$) (MUL C64). Then, turning to the next 65$^{th}$ line after completing the processing on the 64$^{th}$ line, the sum of output data of the accumulator 107 and output data $a_0$x(t) of the multiplier 103, i.e., the calculation result of the first term of the aforementioned Expression 1 is written into the accumulator 107.

Next, on the 65$^{th}$ line, a calculation result y(t−62) is read from address 65 of the temporary memory 108 and outputted through the main selector 110 (SEL T65). Then, the output data y(t−62) of the main selector 110 is multiplied by data C65 (coefficient $b_{62}$) (MUL C65).

Turning next to the 66$^{th}$ line, output data of the accumulator 107, i.e., the sum of the result of the convolution operation of the first term in Equation 1 and output data $b_{62}$y(t−62) of the multiplier 103 is supplied from the adder 105 to the accumulator 107, and written into the accumulator 107. Also, the calculation result y(t−61) stored in the temporary memory 108 at address 66 is outputted through the main selector 110 (SEL T66), and this calculation result y(t−61) is written into the temporary memory 108 at address 65 (WT 65). Further, the multiplier 103 multiplies the output data y(t−61) by data C66 (coefficient $b_{61}$) (MUL C66).

Then, by executing the next 67$^{th}$ line of the program (not shown), the sum of output data (=the result of the convolution operation of the first term in Equation 1+$b_{12}$y(t−62)) of the accumulator 107 and output data $b_{61}$y(t−61) of the multiplier 103 is written into the accumulator 107.

Subsequently, the processing for accumulating the product of a previous calculation result y(t−i) and a coefficient $b_i$ in the accumulator 107 and the processing for shifting a calculation result y(t−i) to an address one number less than the current address in the temporary memory 108 are sequentially executed in a similar manner.

At the time the 128$^{th}$ line of the program has been executed, the final calculation result y(t) of the aforementioned Equation 1 in the current sampling period is found in the accumulator 107. Then, on the 128$^{th}$ line, the final calculation result y(t) is outputted through the main selector 110 (SEL ACC), and written into the temporary memory 108 at address 127 (WT 127) as well as outputted to the outside through the output register 111 (OUTPUT).

Subsequently, every time the sampling period ends and the next sampling period begins, the foregoing processing is repeated.

Then, the calculation result y(t) written into the temporary memory 108 on the 128$^{th}$ line of the program is sequentially shifted from address 127 to address 126, from address 126 to address 125, and so on in the temporary memory 108 in each sampling period. As a result of this shift operation, the calculation results for previous 63 sampling periods are stored in the temporary memory 108 from address 127 to address 65.

(2) Operations when Reverberation Addition Processing is Performed:

Generally, the reverberation addition processing requires a sequence of sample data having a time length extremely longer as compared with the foregoing filtering operation or the like. FIG. 6 illustrates an FIR filtering operation for generating a reverberation sound digital signal from a sequence of sample data in a hardware implementation. In the drawing, z−$^1$ represents a delay operation for delaying sample data by a time corresponding to one sample period. Also, M represents multiplication, and ADD addition. $C_0$–$C_{n-1}$ are filter coefficients for adding reverberation.

In this reverberation addition processing, operations are performed for convoluting the coefficients $C_0$–$C_{n-1}$ into respective sample data produced by delaying input sample data by $T_0$, $T_1$, $T_2$, $T_{n-1}$, respectively. While the number of sample data used in the convolution operation is n, it is necessary to previously store a much larger number of sample data than this for performing the delay operations shown in FIG. 6. However, since the temporary memory 108 has only a small capacity, such an immense number of sample data sequences cannot be stored therein. Thus, for the reverberation addition processing, a large capacity external memory is used as delay means for sample data. The external memory control circuit 109 in FIG. 4 is a means provided for delaying sample data using the external memory.

In the following, details of sample data delaying operations using an external memory 20 will be described with reference to FIG. 7.

First, the external memory control circuit 109 has a built-in counter which is down-counted by one every sampling period. In each sampling period, a count value of this counter is supplied to the external memory 20 as a write address. Also, in each sampling period, output data in the input register 101, i.e., input sample data x(t) from the outside is selected by the main selector 110, and this input sample data x(t) is supplied to the external memory 20 through the external memory control circuit 109. As a result, the sample data x(t) is written into an area corresponding to the write address in the external memory 20.

Similar operations are performed in each of subsequent sampling periods, whereby input sample data to the DSP 100 are sequentially written into the external memory 20 as the write address is sequentially decremented.

Additionally, in each sampling period, n sample data used for the reverberation addition processing are read from the external memory 20 in parallel with the writing of the input sample data.

More specifically, in one sampling period, an address generated by incrementing the write address by $T_0$, an address generated by incrementing the write address by $T_1, \ldots$, an address generated by incrementing the write address by $T_{n-1}$ are sequentially supplied to the external memory 20 as read addresses by the external memory control circuit 109. As a result, in the same sampling period, respective sample data stored in these addresses, i.e., sample data $x(t-T_0)$ a time $T_0$ before the current sampling period, sample data $x(t-T_1)$ a time $T_1$ before the current sampling period, $\ldots$, sample data $x(t-T_{n-1})$ a time $T_{n-1}$ before the current sampling period are read from the external memory 20.

Then, with the configuration illustrated in FIG. 4, the coefficients $C_0 - C_{n-1}$ in FIG. 6 are convoluted into the respective sample data to generate sample data for reverberation sound. Incidentally, since the convolution operation is performed in a manner similar to that previously described in connection with the exemplary program, detailed explanation is omitted.

The conventional DSP described above uses an external memory dedicated to the delay operation for adding reverberation because the reverberation addition processing must be duly advanced in order to continuously generate reverberation sound in real time. However, if it is ensured that previous sample data required for the reverberation addition processing are supplied to the DSP without delay, the DSP can share a memory together with another device such that the shared memory is used for the delay operation instead of providing a dedicated external memory. If this can be realized, the number of parts will be reduced by those associated with the external memory, thus largely contributing to reducing the size and cost of an entire system equipped with a DSP. Generally, since the external memory requires the use of expensive dual port RAM devices for simultaneous read and write operations, the removal of the external memory, if possible, will result in a large economical effect.

SUMMARY OF THE INVENTION

The present invention has been made under the circumstance as mentioned above, and its object is to provide a digital signal processor which is capable of sharing a memory with another device in order to execute processing operations including a delay operation over a long time such as reverberation addition or the like, by using the shared memory.

The invention provides a digital signal processor which sequentially receives digital signals from the outside every predetermined sampling period and executes a predetermined processing operation using previously received digital signals, characterized by:

a. comprising data buffer means for temporarily storing digital signals to be used for the processing operation;

b. sharing external storage means with another device, and acquiring an access right to the storage means to sequentially store digital signals received from the outside into the external storage means, while transferring a cache block comprising a predetermined amount of digital signals to be used for the processing operation from the storage means to the data buffer means every time a predetermined amount of the digital signals are stored in the storage means; and c. comprising cache storage control means for executing an operation for reading a digital signal corresponding to a time point retrospected by a predetermined time from a current time point from the data buffer means to deliver the digital signal to the processing operation every sampling period.

Another aspect of the invention provides a digital signal processor which sequentially receives digital signals from outside every predetermined sampling period and executes a predetermined processing operation using previously received digital signals, where the digital signal processor functions as means used for executing a processing operation which processes digital signals at a plurality of time points respectively retrospected by corresponding predetermined times from a current time point, characterized by:

a. comprising data buffer means for temporarily storing digital signals to be used for the processing operation;

b. sharing an external storage means with another device, and acquiring an access right to the storage means to sequentially store digital signals received from the outside in the external storage means, while transferring a plurality of cache blocks, each comprising a predetermined amount of digital signals to be used for the processing operation as digital signals at each of the plurality of time points, from the storage means to the data buffer means every time a predetermined amount of the digital signals are stored in the storage means; and c. comprising cache storage control means for executing an operation for reading a digital signal corresponding to each of time points retrospected by each -predetermined time from the current time point from the data buffer means to deliver the digital signal to the processing operation every sampling period.

Still another invention provides a digital signal processor, in which the cache storage control means includes input data buffer means for storing digital signals sequentially received from the outside, such that the cache storage control means acquires an access right to the storage means to transfer a cache block comprising a predetermined amount of digital signals from the input data buffer means to the storage means every time the predetermined amount of the digital signals are stored in the input data buffer means.

BRIEF DESCRIPTION OF THE DRAWINGS

FIG. 5 is a diagram illustrating an exemplary program executed by the DSP;

DESCRIPTION OF THE PREFERRED EMBODIMENTS

An embodiment of the present invention will hereinafter be described for further facilitating the understanding of the present invention. As such an embodiment merely illustrates one form of the present invention, it is not intended to limit the present invention, and modifications can be arbitrarily made within the scope of the present invention.

Figure 1:
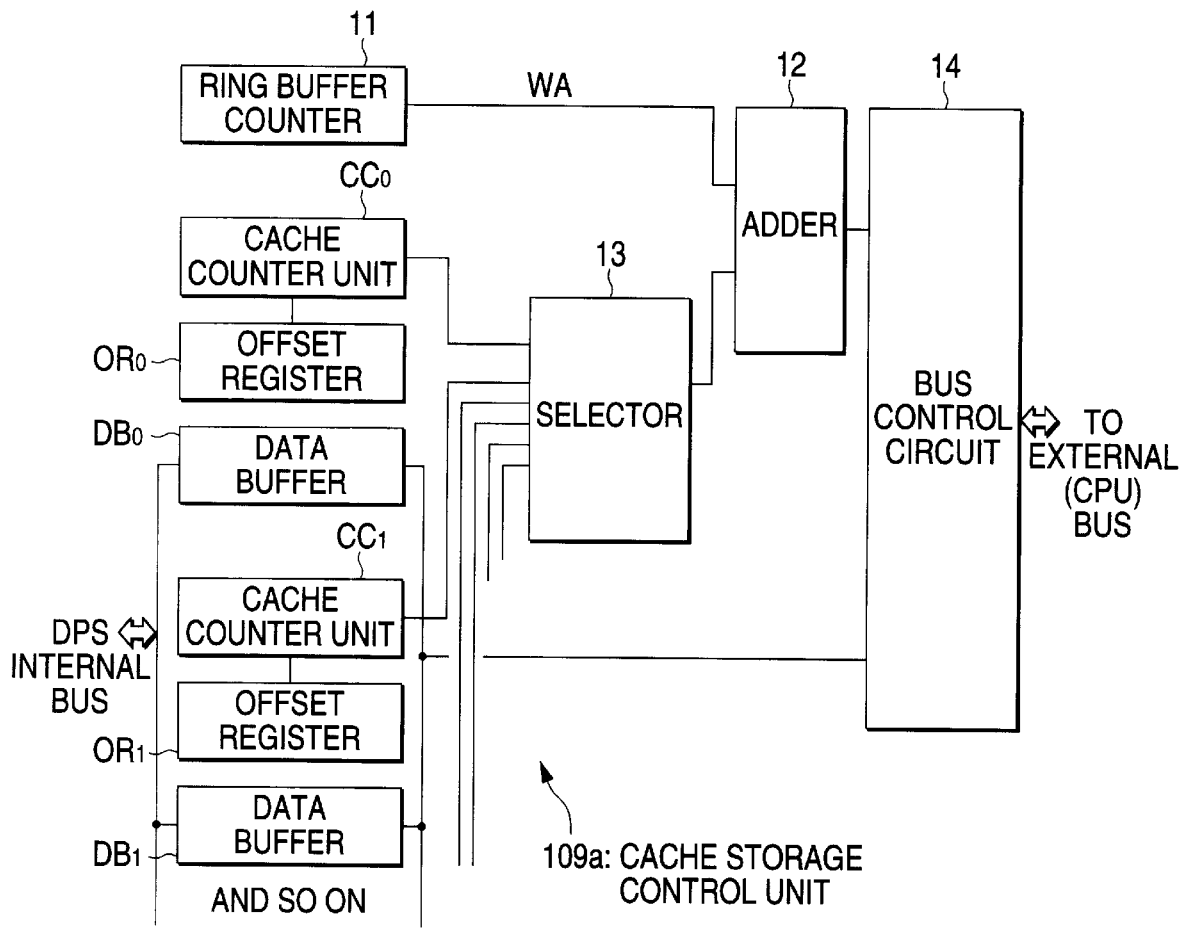
FIG. 1 is a block diagram illustrating the configuration of a cache storage control unit of a DSP according to one embodiment of the present invention.
Figure 2:
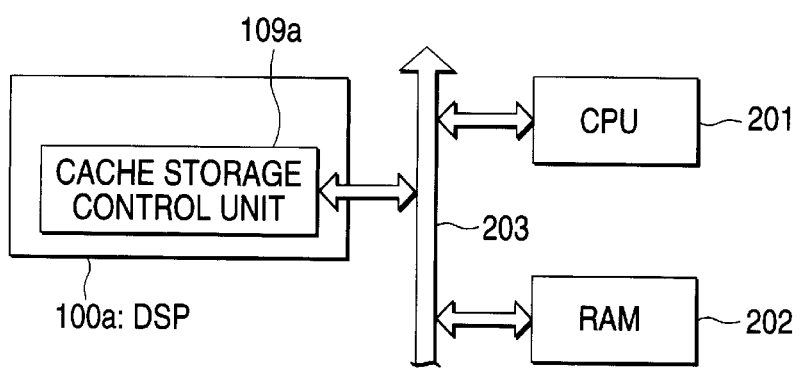
FIG. 2 is a diagram illustrating a used state of the DSP.
Figure 4:
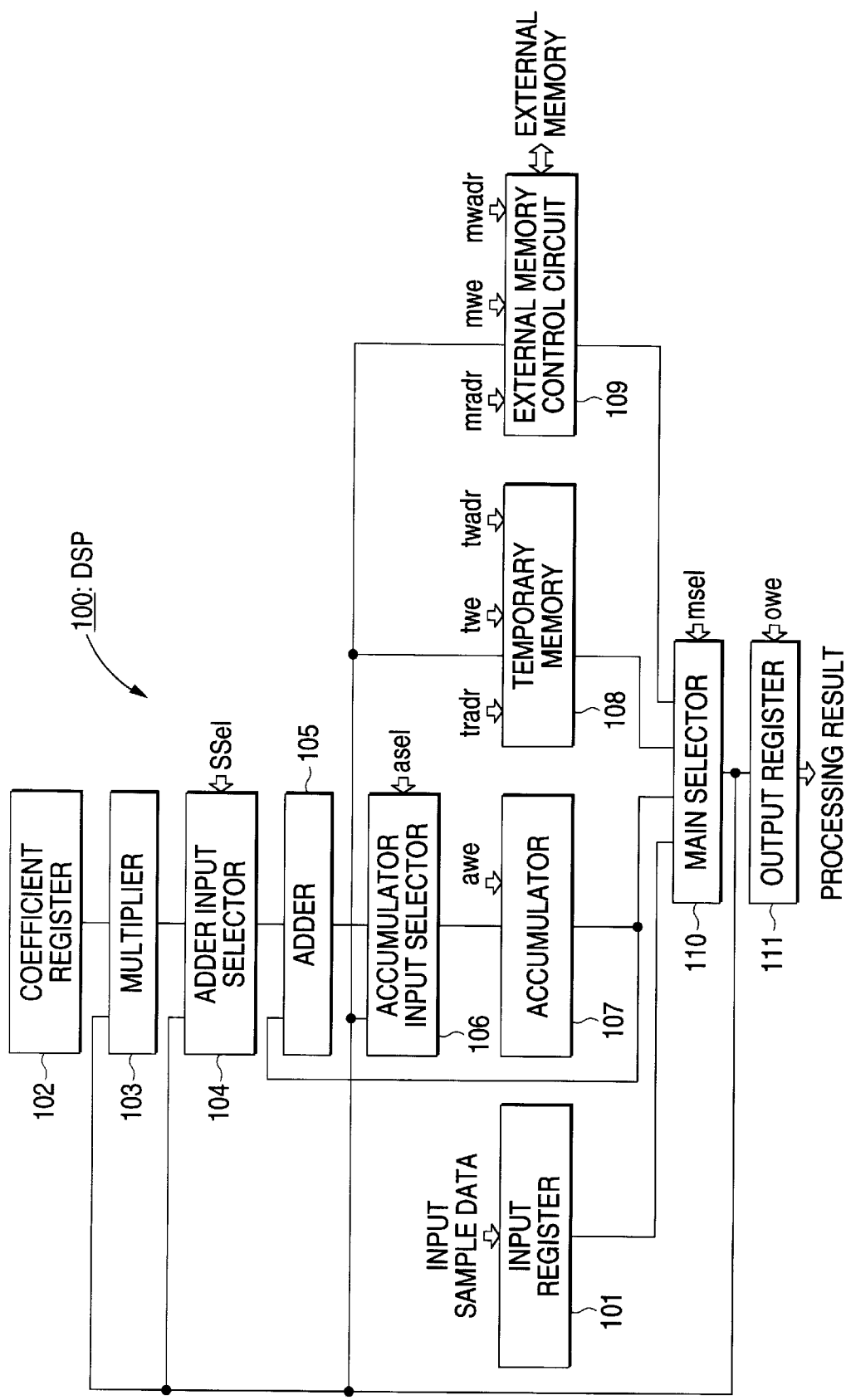
FIG. 4 is a block diagram illustrating the configuration of a conventional DSP.

A DSP according to this embodiment has a configuration in which the external memory control circuit 109 in the DSP 100 illustrated in FIG. 4 is replaced by a cache storage control unit 109a illustrated in FIG. 1. FIG. 2 is a block diagram illustrating the configuration of a system equipped with the DSP 100a having such a configuration.

As illustrated in FIG. 2, the DSP 100a according to this embodiment is connected to a bus 203 together with a CPU 201, which functions as a higher rank processor, and a RAM 202. The RAM 202 is used as a storage means for storing a sequence of sample data for a past predetermined time period for performing delay operations for sample data to be processed by the DSP 100a, as well as a storage means for storing control information and so on for the CPU 201 to perform a variety of controls.

Specifically, in contrast to the conventional DSP 100 which occupies the dedicated external memory 20 for performing the delay operations, the DSP 100a according to this embodiment shares the RAM 202 with the CPU 201 such that the DSP 100a acquires the RAM access right from the CPU 201 to execute digital signal processing using the RAM 202.

Figure 6:
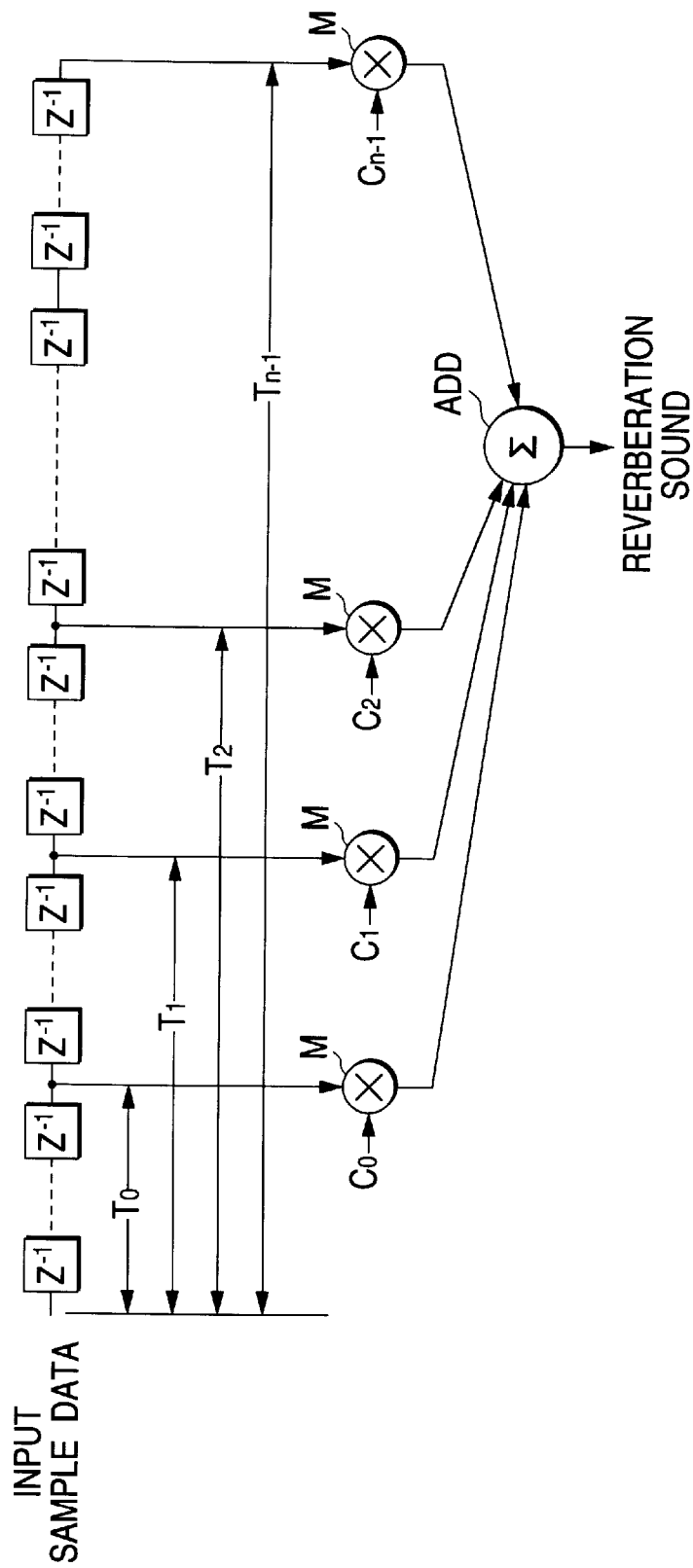
FIG. 6 is a diagram illustrating an example of an FIR filtering operation for reverberation addition.
Figure 7:
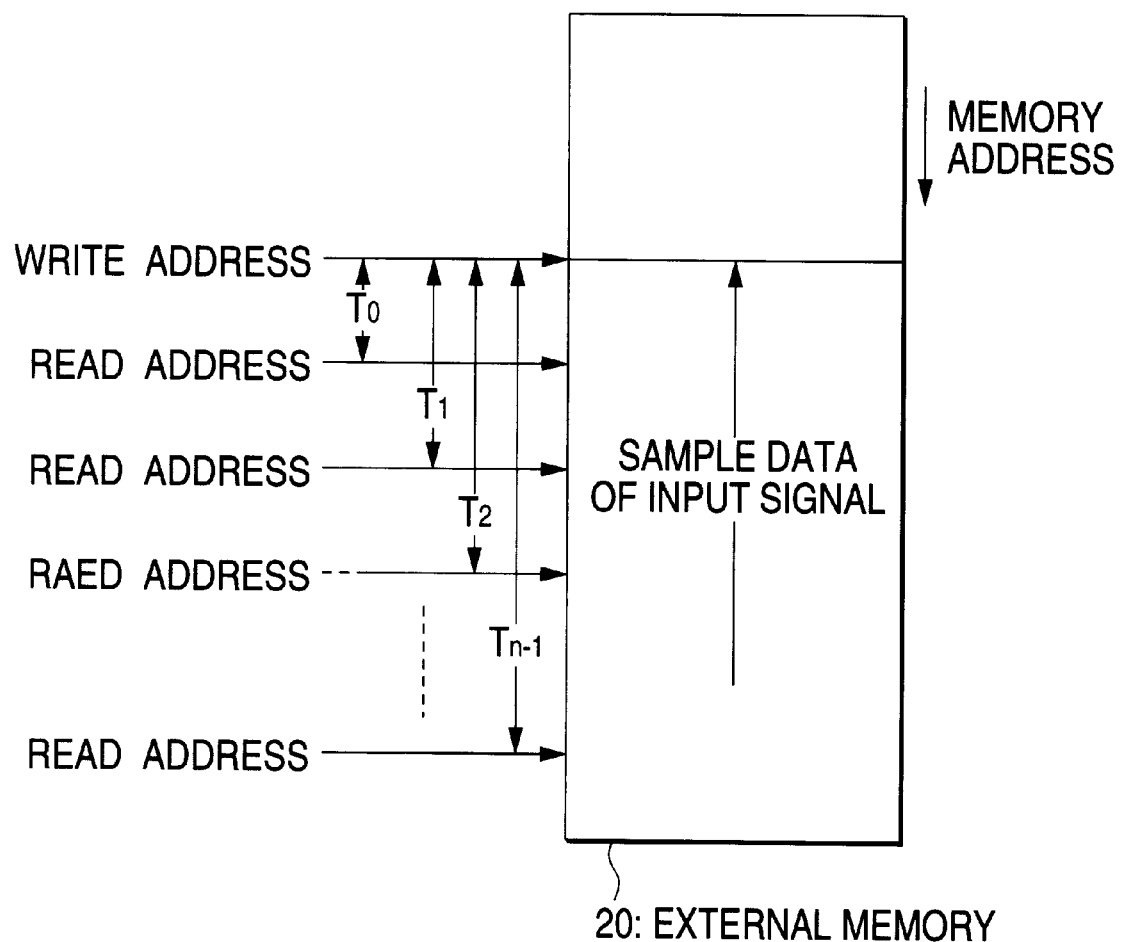
FIG. 7 is a diagram for explaining a delay operation in the FIR filtering operation.

The DSP 100a is configured to be capable of executing the FIR filtering operation for adding reverberation, as illustrated in FIG. 6. In the FIR filtering operation, sample data are transferred and received between the DSP 100a and the RAM 202 through the bus 203 to execute delay operations of the sample data. Additionally, the RAM 202 is also used by the CPU 201. Therefore, if no measures were taken, this would cause a situation in which the DSP 100a could not read sample data from the RAM 202 at the time the DSP 100a should use the sample data for a processing operation.

The cache storage control unit 109 illustrated in FIG. 1 is a means provided for avoiding such a situation and functions to previously read and stock sample data to be used by the DSP 100a for a processing operation from the RAM 202 and to deliver the stocked sample data to processing means (see FIG. 4) in the DSP 100a at timings at which each data is required. In the following, the configuration of the cache storage control unit 109a will be described.

The cache storage control unit 109 illustrated in FIG. 1 comprises a ring buffer counter 11 which is down-counted by a clock generated every time a sampling period ends and the next sampling period begins; an adder 12; and a selector 13 for selecting a signal to be supplied to the adder 12. The adder 12 adds a count value of the ring buffer counter 11 and a signal provided thereto through the selector 13 and outputs the addition result. A bus control circuit 14 executes an operation for previously acquiring an access right to the RAM 202 when the DSP 100a writes sample data into the RAM 202 or reads data from the RAM 202, and supplies the RAM 202 with write addresses into which sample data are written or read addresses from which sample data are read.

When sample data is written into the RAM 202, a fixed value "0" is selected by the selector 13. Responsively, a count value WA of the ring buffer counter 11 is supplied as it is to the bus control circuit 14 through the adder 12, and then is supplied to the RAM 202 as a write address of the sample data.

On the other hand, a read address of sample data is basically generated based on the count value of the ring buffer counter 11 and a delay time applied to a delay operation for particular sample data. Next, a configuration for generating a read address will be described.

Referring again to FIG. 1, the cache storage control unit 109a comprises a cache counter unit $CC_0$, an offset register $OR_0$, and a data buffer $DB_0$. Here, stored in the offset register $OR_0$ is an offset value corresponding to a delay time $T_0$ in the foregoing FIG. 6. The data buffer DBo is a means for receiving sample data read from the RAG 202 through the bus control circuit 14 and preserving the sample data therein. The cache counter unit $CC_0$ is a means for previously collecting a predetermined amount of sample data to be used in the FIR filtering operation and transferring a collection of sample data from the RAM 202 to the data buffer $DB_0$. Stated another way, the cache counter unit $CC_0$ performs a control based on the count value WA of the ring buffer counter 11 for monitoring an amount of sample data remaining in the data buffer $DB_0$, which has not been used for the FIR filtering operation, and for supplementing the predetermined amount of sample data from the RAM 202 to the data buffer $DB_0$ at the time the remaining amount of sample data in the data buffer $DB_0$ is below a threshold. Details on this control will be later described. In addition to the cache counter unit and so on described above, the cache storage control unit 109a comprises cache counter units $CC_1$–$CC_{n-1}$; offset registers $OR_1$–$OR_{n-1}$, and data buffers $DB_1$–$DB_{n-1}$ corresponding to taps (delay times $T_1$–$T_{n-1}$) of the FIR filtering operation illustrated in FIG. 6.

Figure 3:
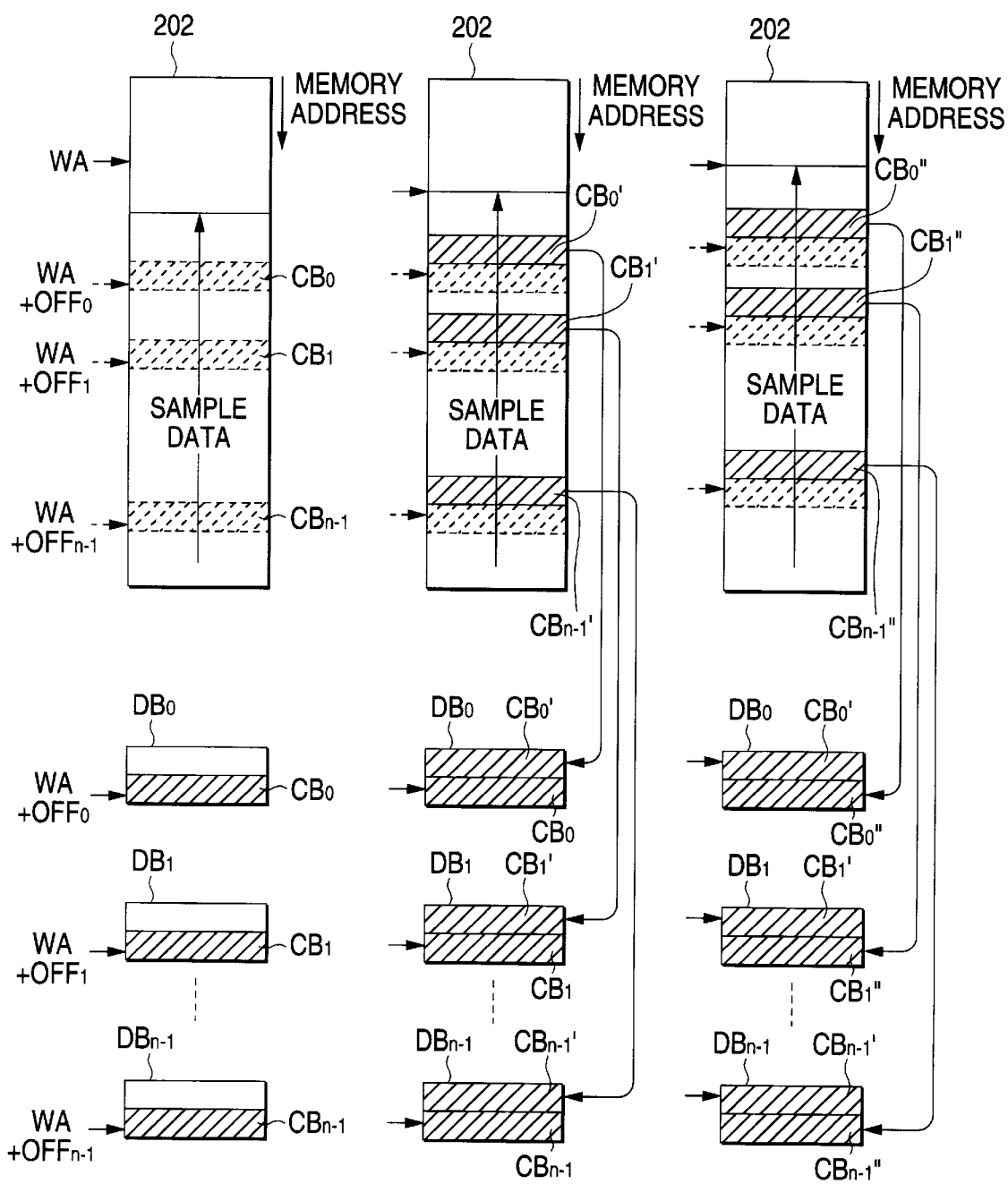
FIGS. 3(a) through 3(c) illustrate the inputting and outputting of sample data from RAM for executing FIR filtering according to the present invention.

FIGS. 3A–3C illustrate how sample data are inputted to and outputted from the RAM 202 for executing the FIR filtering operation shown in FIG. 6. The operation of this embodiment will hereinafter be described with reference to FIGS. 3A–3C.

First, in a state illustrated in FIG. 3A, data buffers $DB_0$–$DB_{n-1}$ store cache blocks $CB_{n-1}$, $CB_{n-1}$, respectively. Each of these cache blocks $CB_0$–$CB_{n-1}$ comprises a predetermined amount of sample data stored in the RAM 202. In FIG. 3A, areas in the RAM 202 in which the cache blocks $CB_0$–$CB_{n-1}$ have been originally stored are shaded. Also, WA, WA+$OFF_0$, WA+$OFF_1$, WA+$OFF_{n-1}$ are shown in FIGS. 3A–3C, where WA designates a count value of the ring buffer counter 11, and $OFF_0$–$OFF_{n-1}$ designate offset values set to the respective offset registers $OR_0$–$OR_{n-1}$.

Here, the count value WA of the ring buffer counter 11 is decremented every time a sampling period ends and the next sampling period begins, and the decremented count value WA is supplied to the RAM 202 as a write address. Also, input sample data to the DSP 100a is supplied to the RAM 202 through the bus control circuit 14. In this way, input sample data are sequentially written into the RAM 202 as the write address is decremented.

At addresses WA+OFFF$_0$–WA+OFF$_{n-1}$ in the RAM 202, sample data to be used for the FIR filtering operation illustrated in FIG. 6 are stored, respectively. However, in a state illustrated in FIG. 3A, the cache blocks CB$_0$–CB$_{n-1}$ including respective sample data corresponding to the addresses WA+OFFF$_0$–WA+OFF$_{n-1}$ are stored in the data buffer DB$_0$–DB$_{n-1}$. Thus, no sample data is read from the RAM 202, and instead the respective sample data corresponding to addresses WA+OFFF$_0$–WA+OFF$_{n-1}$ stored in the data buffer DB$_0$–DB$_{n-1}$ are supplied to the processing means (see FIG. 4) in the DSP 100$a$ for use in the FIR filtering operation. The sample data are read from the data buffers DB$_0$–DB$_{n-1}$ under the control of the cache counter units CC$_0$–CC$_{n-1}$.

The count value WA of the ring buffer counter 11 is decremented as a sampling period ends and the next sampling period begins, and the addresses WA+OFFF$_0$–WA+OFF$_{n-1}$ are also decremented in association therewith. Then, respective sample data corresponding to the decremented addresses are sequentially read from the data buffers DB$_0$–DB$_{n-1}$ and used for the FIR filtering operation. As sample data are read from the data buffers DB$_0$–DB$_{n-1}$, the number of sample data remaining unused for the FIR filtering operation in the cache blocks CB$_0$–CB$_{n-1}$ stored in the data buffers DB$_0$–DB$_{n-1}$ is gradually decreased. The cache counter units CC$_0$–CC$_{n-1}$ monitor an amount of such unused sample data based on the count value WA. Then, a control is performed to supplement the predetermined amount of sample data to each of the data buffers DB$_0$–DB$_{n-1}$ from the RAM 202 at the time the amount of unused sample data is decreased, for example, below one half of the cache block size. This control will be described below in detail.

First, an access right to the RAM 202 is acquired by the bus control unit 14. Next, the cache counter unit CC$_0$ is selected by the selector 13. Then, predetermined processing is performed by the cache counter unit CC$_0$ using the offset value OFF$_0$ set in the offset register OR$_0$ and the current count value WA of the ring buffer counter 11, and a series of addresses generated by this processing is supplied to the adder 12 through the selector 13.

The above processing results in outputting from the adder 12 addresses at which are stored respective sample data constituting the cache block CB$_0$' (see FIG. 3B) subsequent to the cache block CB$_0$ in the data buffer DB$_0$, and the addresses are sequentially supplied to the RAM 202 as read addresses through the bus control unit 14.

As a result, the cache block CB$_0$' is read from the RAM 202 and supplied to the data buffer DB$_0$ through the bus control circuit 14, as illustrated in FIG. 3B. Then, the cache block CB$_0$' is stored in an empty area which is not occupied by the cache block CB$_0$ in the data buffer DB$_0$.

Subsequently, the cache counter units CC$_1$–CC$_{n-1}$ are sequentially selected by the selector 13, and the operations similar to the foregoing are performed for each of the cache counter units CC$_1$–CC$_{n-1}$. As a result, cache blocks CB$_1$'–CB$_{n-1}$' are supplemented in empty areas in the data buffers DB$_0$–DB$_{n-1}$, respectively.

After the cache blocks CB$_0$–CB$_{n-1}$ in the data buffers DB$_0$–DB$_{n-1}$ have all been used for the FIR filtering operation, sample data constituting the cache blocks CB$_1$'–CB$_{n-1}$' are continuously used in sequence for the FIR filtering operation. Then, if the number of sample data not used for the FIR filtering operation in the respective cache blocks CB$_1$'–CB$_{n-1}$' is below one half of the cache block size, cache blocks CB$_1$"–CB$_{n-1}$" subsequent to the cache blocks CB$_1$'–CB$_{n-1}$' are read from the RAM 202 and supplied to the data buffers DB$_0$–DB$_{n-1}$ through the bus control circuit 14, as illustrated in FIG. 3C. The cache blocks CB$_1$"–CB$_{n-1}$" are written over the areas in which the used cache blocks CB$_0$–CB$_{n-1}$ are stored in the data buffers DB$_0$–DB$_{n-1}$.

In this embodiment as described above, instead of directly reading sample data from the RAM 202 for use in the FIR filtering operation, cache blocks each comprising a predetermined amount of sample data are previously read and stocked for use in the FIR filtering operation at necessary timing. Thus, necessary sample data can be delivered to the FIR filtering operation in real time without using a dedicated external memory as is the case of the aforementioned conventional art.

While the cache storage control for reading sample data from the RAM 202 has been described above, it goes without saying that completely the same cache storage control can be applied when externally supplied sample data are written into the RAM 202. Specifically, the DSP 100$a$ is provided with an input data buffer for storing sample data sequentially received from the outside and a cache counter unit similar to the foregoing cache counter unit. As a predetermined amount of sample data are stored in the input data buffer, an access right to the RAM 202 is acquired to write a cache block comprising the predetermined amount of digital signals into the RAM 202 at each of continuous addresses beginning with address WA. In this way, the sample data can be also smoothly written into the RAM 202.

While the foregoing embodiment has been described, as an example, for the case where the FIR filtering operation having a large number of taps is executed, the present invention can be applied not only to the delay operation for the FIR filtering operation but also to delay operations for a variety of digital signal processing.

As described above, the digital signal processor according to the present invention, which shares a memory with another device, can advantageously execute processing operations including a delay operation extending for a long time such as reverberation addition and so on using the shared memory, thus making it possible to reduce a number of parts and hence the size and cost of an entire system equipped with this digital signal processor.

What is claimed is:

1. A digital signal processor for operatively coupling to an external storage device which is connected to an external processing device, said digital signal processor being connected to the external storage device and the external processing device via a system bus, the digital signal processor comprising:

a data buffer segment operatively coupled to the external storage device;

a cache storage control segment operatively coupled to the external storage device and said data buffer segment, for transferring a sequence of sample data to and from the external storage device and the data buffer segment via said system bus, said cache storage control segment including means for acquiring a right to access the external storage device and means for transferring plural sample data as a cache block to and from the external device and said data buffer segment via said system bus, said plural sample data constituting at least a part of said sequence of the sample data stored in at least one of the external storage device and the data buffer segment, whereby said digital signal processor is accessible to the external storage device without need of a dedicated local memory device of a type similar to said external storage device; and a digital data processing segment connected to said data buffer segment, for processing sample data in said data buffer segment.

2. The digital signal processor according to claim 1, wherein said sequence of the sample data is sample data inputted from an external device.

3. The digital signal processor according to claim 1, wherein access right acquiring means of said cache storage control segment acquires the right to access the external storage device from the external processing device.

4. The digital signal processor according to claim 1, wherein the digital signal processor is operatively coupled to the external storage device and the external processing device through a bus.

5. The digital signal processor according to claim 1, wherein said data buffer segment is divided into plural parts.

6. A method of processing a digital signal in a digital signal processor including a data buffer segment, the digital signal processor being operatively coupled to an external storage device which is operatively connected to an external processing device, said digital signal processor being connected to the external storage device and the external processing device via a system bus, said method comprising the steps of:

acquiring a right to access the external storage device;

transferring via the system bus a sequence of sample data to and from the external storage device and the data buffer segment, for storing and processing, respectively, the sequence of sample data;

transferring plural sample data from said sequence of sample data as a cache block to and from the external storage device and the data buffer segment via the system bus; and processing said plural sample data transferred into the data buffer segment, whereby said digital signal processor is accessible to the external storage device without need of a dedicated local memory device of a type similar to said external storage device.

7. The digital signal processing method of claim 6, wherein said sequence of sample data is inputted from an external device.

8. The digital signal processing method of claim 6, wherein the step of acquiring the access right to the external storage device includes acquiring the access right to the external storage device from the external processing device.

9. The digital signal processing method of claim 6, wherein:

the operative coupling of the digital signal processor to the external storage device and the external processing device is through a bus.

10. The digital signal processing method of claim 6, wherein:

the data buffer segment is divided into plural parts.

11. A digital signal processor for operatively coupling to an external storage device which is operatively connected to an external processing device, said digital signal processor being connected to the external storage device and the external processing device via a system bus, the digital signal processor comprising:

data buffer means operatively coupled to the external storage device, for temporarily storing sample data;

means operatively coupled to the external storage device and said data buffer means, upon acquiring a right to access the external storage device for transferring via the system bus a sequence of sample data to and from the external storage device and the data buffer means, and for transferring via the system bus, plural sample data as a cache block to and from the external storage device and said data buffer means, said plural sample data constituting at least a part of said sequence of the sample data to be transferred, whereby said digital signal processor is accessible to the external storage device without need of a dedicated local memory device of a type similar to said external storage device; and means connected to said data buffer means for processing said sample data transferred into said data buffer means.

* * * * *